(12) United States Patent
Tijssen (10) Patent No.: US 9,019,223 B2
(45) Date of Patent: Apr. 28, 2015

(54) TOUCH INPUT LAYOUT CONFIGURATION

(71) Applicant: Adobe Systems Incorporated, San Jose, CA (US)

(72) Inventor: Remon Tijssen, Mill Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 94 days.

(21) Appl. No.: 13/799,296

(22) Filed: Mar. 13, 2013

(65) Prior Publication Data

US 2014/0267063 A1    Sep. 18, 2014

(51) Int. Cl.
G06F 3/041    (2006.01)
G06F 3/0488   (2013.01)

(52) U.S. Cl.
CPC ............ *G06F 3/041* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 8,547,347 B2 * | 10/2013 | Chiang et al. | 345/173 |
| 8,803,816 B2 * | 8/2014 | Kilpatrick et al. | 345/173 |
| 2007/0083372 A1 * | 4/2007 | Cho et al. | 704/256 |
| 2007/0097084 A1 * | 5/2007 | Niijima | 345/173 |
| 2007/0247441 A1 * | 10/2007 | Kim et al. | 345/173 |
| 2008/0225017 A1 * | 9/2008 | Kim et al. | 345/175 |
| 2008/0304084 A1 * | 12/2008 | Kim et al. | 356/614 |
| 2009/0289916 A1 * | 11/2009 | Dai | 345/173 |
| 2010/0079392 A1 * | 4/2010 | Chiang et al. | 345/173 |
| 2010/0229090 A1 * | 9/2010 | Newton et al. | 715/702 |
| 2010/0321322 A1 * | 12/2010 | Sohn | 345/173 |
| 2011/0060499 A1 * | 3/2011 | Suzuki | 701/36 |
| 2011/0193812 A1 * | 8/2011 | Uchida | 345/173 |
| 2011/0197263 A1 * | 8/2011 | Stinson, III | 726/4 |
| 2012/0026129 A1 * | 2/2012 | Kawakami | 345/174 |
| 2012/0075235 A1 * | 3/2012 | Hong et al. | 345/174 |
| 2012/0127109 A1 * | 5/2012 | Nishio et al. | 345/173 |
| 2012/0146930 A1 * | 6/2012 | Lee | 345/173 |
| 2012/0176322 A1 * | 7/2012 | Karmi et al. | 345/173 |
| 2012/0212420 A1 * | 8/2012 | Shin | 345/173 |
| 2012/0249432 A1 * | 10/2012 | Ge | 345/173 |
| 2013/0021381 A1 * | 1/2013 | Zhang et al. | 345/661 |
| 2013/0120447 A1 * | 5/2013 | Kim et al. | 345/629 |
| 2013/0154993 A1 * | 6/2013 | Hristov | 345/174 |
| 2013/0321303 A1 * | 12/2013 | Madanmohan | 345/173 |
| 2014/0204040 A1 * | 7/2014 | Kim et al. | 345/173 |

* cited by examiner

*Primary Examiner* — Peter Vincent Agustin
(74) *Attorney, Agent, or Firm* — Wolfe-SBMC (57) ABSTRACT

Touch input layout creation is described. In one or more implementations, a number of touch inputs is determined that were detected through proximity to a touchscreen device. A user interface is configured to have a number of cells based on the determined number of touch inputs, the cells configured to have a size along a first axis based at least in part on an available area along the first axis within the user interface to display the cells and a size along a second axis based at least in part on a location of one of more of the touch inputs.

20 Claims, 8 Drawing Sheets

TOUCH INPUT LAYOUT CONFIGURATION

BACKGROUND

Layouts may be utilized for a variety of different purposes. For example, layouts may be used to configure a webpage, arrange portions of a magazine article, configure a content navigation page, position items for ecommerce, and so on.

Conventional techniques that were utilized to specify these layouts, however, could be complicated and involve sophisticated techniques to specify the layout. Consequently use of these techniques could be limited to users that were familiar with these sophisticated techniques, thereby limiting the usefulness of these techniques to other users.

SUMMARY

Touch input layout creation is described. In one or more implementations, a number of touch inputs is determined that were detected through proximity to a touchscreen device. A user interface is configured to have a number of cells based on the determined number of touch inputs, the cells configured to have a size along a first axis based at least in part on an available area along the first axis within the user interface to display the cells and a size along a second axis based at least in part on a location of one of more of the touch inputs.

In one or more implementations, one or more inputs are recognized as describing movement of one or more touch inputs through at least one cell in a layout in a user interface. A number is determined of the one of more touch inputs involved in the one or more inputs. The at least one cell is divided into one or more cells in the user interface based at least in part on a number of the one or more touch inputs.

In one or more implementations, an input is recognized as being associated with one or more cells in the user interface. Responsive to the recognition, an option is output in a user interface that is user selectable to add a cell along an axis associated with the one or more cells, delete at least one cell arranged along the axis, or delete each of the cells positioned along the axis.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional techniques that were utilized to create a layout of cells in a user interface could involve specialized knowledge on the part of a user in order to create the layout. Consequently, these conventional techniques could be limited to use by sophisticated users and were often considered daunting by casual users.

Touch input layout creation techniques. In one or more implementations, layout creation techniques are described that may leverage touch inputs, such as one or more fingers of a user's hand, a stylus, and so on. For example, a user may interact with a touch pad, touchscreen device, a touch pad, and so on. As part of this interaction, a user may use a number of touch inputs, such as through a plurality of fingers of a user's hand. The number of touch inputs may then be leveraged to specify a number of cells to be created to form a layout at a corresponding portion of the user interface. A user, for instance, may place three fingers to specify a row in the user interface.

In response, a row of three cells may be created that have a width defined by an available display area in the user interface along the row and having a height defined at least in part on a location in the user interface of one or more of the touch inputs. Although rows were described in this example, other examples are also contemplated, such as columns, diagonals, and so forth. Further, techniques may be used to resize the height of the cells based on subsequent movement of the touch inputs, e.g., to change the height "up or down" based on movement along a y axis. Upon "lifting" of the touch inputs, subsequent rows of cells may then be created using similar techniques. Additional techniques are also described, such as to divide already created cells using a gesture. Further discussion of these and other techniques may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
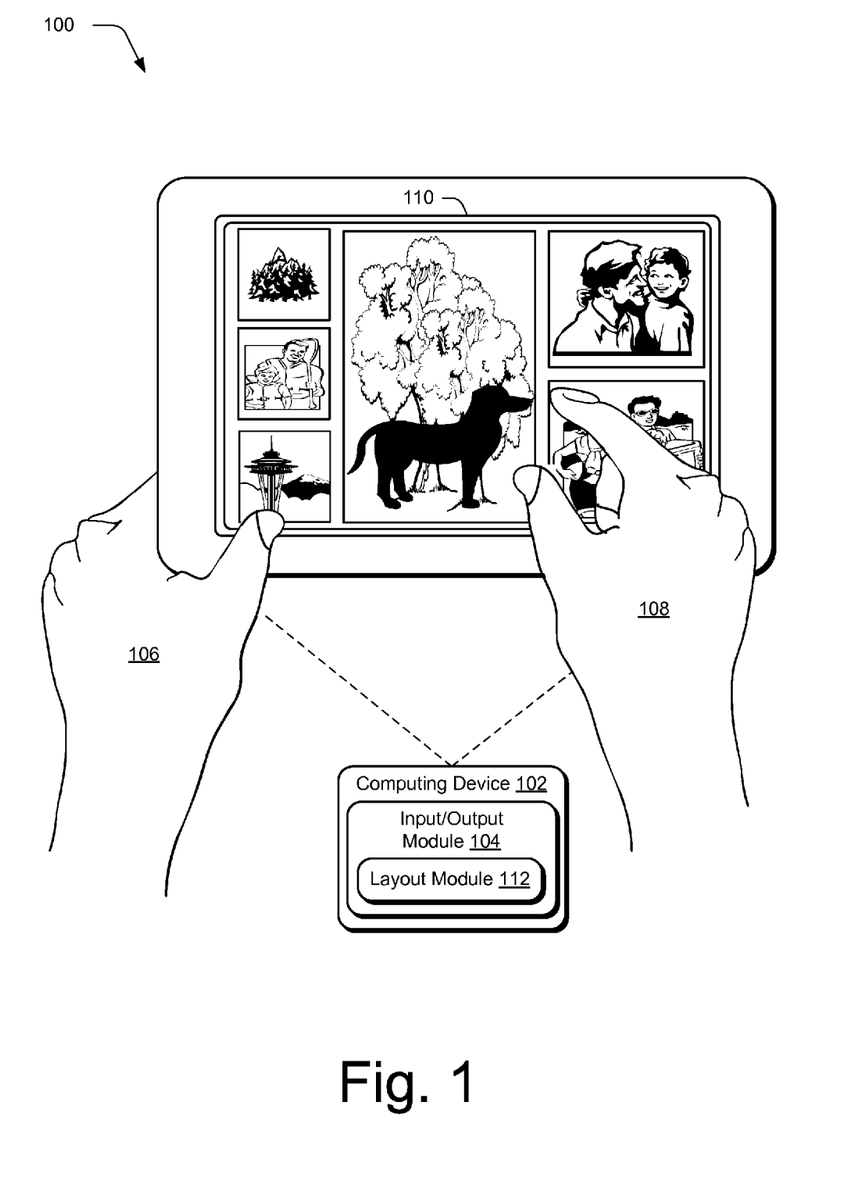
FIG. 1 is an illustration of an environment in an example implementation that is operable to employ layout techniques described herein.

FIG. 1 is an illustration of an environment 100 in an example implementation that is operable to employ gesture techniques. The illustrated environment 100 includes an example of a computing device 102 that may be configured in a variety of ways. For example, the computing device 102 may be configured as a tablet as illustrated, a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 8. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 104. The input/output module 104 is representative of functionality to identify inputs and cause operations to be performed responsive to those inputs. Further, the input/output module 104 may generate outputs, such as to render a display in a user interface, output audio, physical printing, and so on.

One example of an input is a gesture, which may be utilized to initiate a variety of different operations. The gesture may be identified by the input/output module 104 from a variety of different touch inputs, from fingers of a user's hand, a stylus, or other implement. For example, the computing device 102 is illustrated as assuming a tablet configuration in which a housing of the computing device is held by a hand 106 of a user. A finger of the user's other hand 108 is recognized through touchscreen functionality of a display device 110 as being as proximal to the display device 108. This detection may be used to support a variety of different gestures.

The touch input may be recognized as including attributes (e.g., movement, selection point, etc.) that are usable to differentiate the touch input from other touch inputs recognized by the input/output module 104. This differentiation may then serve as a basis to identify a gesture from the touch inputs and consequently an operation that is to be performed based on identification of the gesture.

For example, a finger of the user's hand 108 is illustrated as selecting an image displayed by the display device 110. Selection of the image and subsequent movement of the finger of the user's hand 108 may be recognized by the input/output module 104. The input/output module 104 may then identify this recognized movement as indicating a "drag and drop" operation, resizing operation, and so on alter display of an item in the displayed user interface. A variety of other examples of gestures and the leveraging of touch inputs are also contemplated.

In one such example, the input/output module 104 is illustrated as including a layout module 112. The layout module is representative of functionality to generate a layout in a user interface based on touch inputs. As illustrated in FIG. 1, for instance, a user interface is displayed in a user interface by the display device 110. In this example, the layout is used to arrange images for viewing by a user in a series of columns, although other examples are also contemplated such as rows and so on. The layout includes cells via which content may be arranged, such as portions of a webpage, items for ecommerce, audio files, and so on. Thus, the layout may specify how these items are arranged in relation to each other for viewing by users. This layout may be created in a variety of ways, an example of which is described in beginning in relation to the following discussion and corresponding figure.

Figure 2:
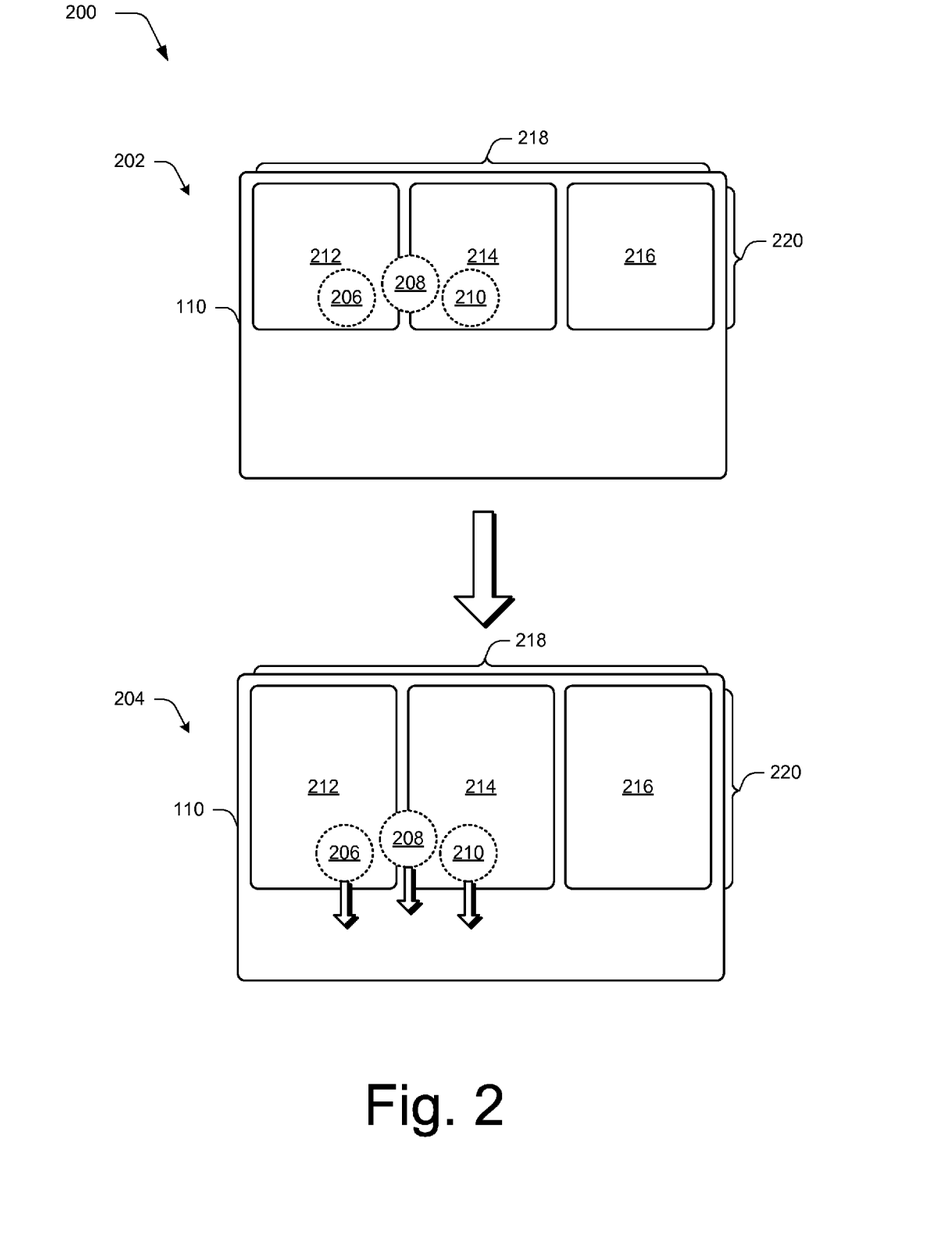
FIG. 2 depicts a system in an example implementation in which creation and resizing of cells in a layout is shown.

FIG. 2 depicts a system 200 in an example implementation in which creation and resizing of cells in a layout is shown. The system 200 is illustrated using first and second stages 202, 204. At the first stage 202, the display device 110 of FIG. 1 is shown that includes touchscreen functionality. Three touch inputs 206, 208, 210 are illustrated through the use of phantom circles. These touch inputs 206-210 may be detected in a variety of ways, such as through capacitive, resistive, acoustic, and/or optical sensors to detect three fingers of a user's hand as proximal to the display device 110.

Responsive to this detection, the layout module 112 of the input/output module 104 may determine a number of the touch inputs, which is three in this example. The layout module 112 may then create three cells 212, 214, 216 based on this number. The creation of the cells 212, 214, 216 may be performed in a variety of ways. For example, the cells 212, 214, 216 may be created to have a size based on an available display area in a user interface on the display device 110. This is illustrated as arranged along a horizontal axis 218 in the illustrated example such that each of the cells 212, 214, 216 has a matching size along the horizontal axis with gaps disposed between the cells.

The cells 212, 214, 216 may also be configured to have a size along a vertical axis 220 based at least in part on a location of one or more of the touch inputs 206, 208, 210. In the illustrated example, the height is based to be slightly below a position of the touch inputs 206, 208, 210. A variety of other examples are also contemplated, such as to be based on an average location of the touch inputs 206, 208, 210 along the axis 220, use of an offset as described above, use of one but not all of the touch inputs, and so on. Thus, at this point a number of the cells 212, 214, 216 have been created based on a number of touch inputs, the cells having a size based on the location of the touch inputs and available display area in the user interface. The number of cells may also be changed dynamically, such as by a user adding or removing touch inputs while other touch inputs are also detected, such as to pick up or add fingers against the display for detection.

At the second stage 204, the cells are illustrated as being resized based on subsequent movement of the touch inputs 206, 208, 210. In this example, the touch inputs are illustrated as being moved downward as generally corresponding to the vertical axis 220, which is shown through the use of arrows. In response to this movement, each of the cells 212, 214, 216 is resized along the vertical axis 220. Thus, a user may create and resize cells using one or more continuous gestures in which the fingers of the user's hand remain proximal to the display device 110 until a desired number and size of cells are reached in the layout. Additional cells may also be created in a similar manner as described in the following discussion and shown in the corresponding figure.

Figure 3:
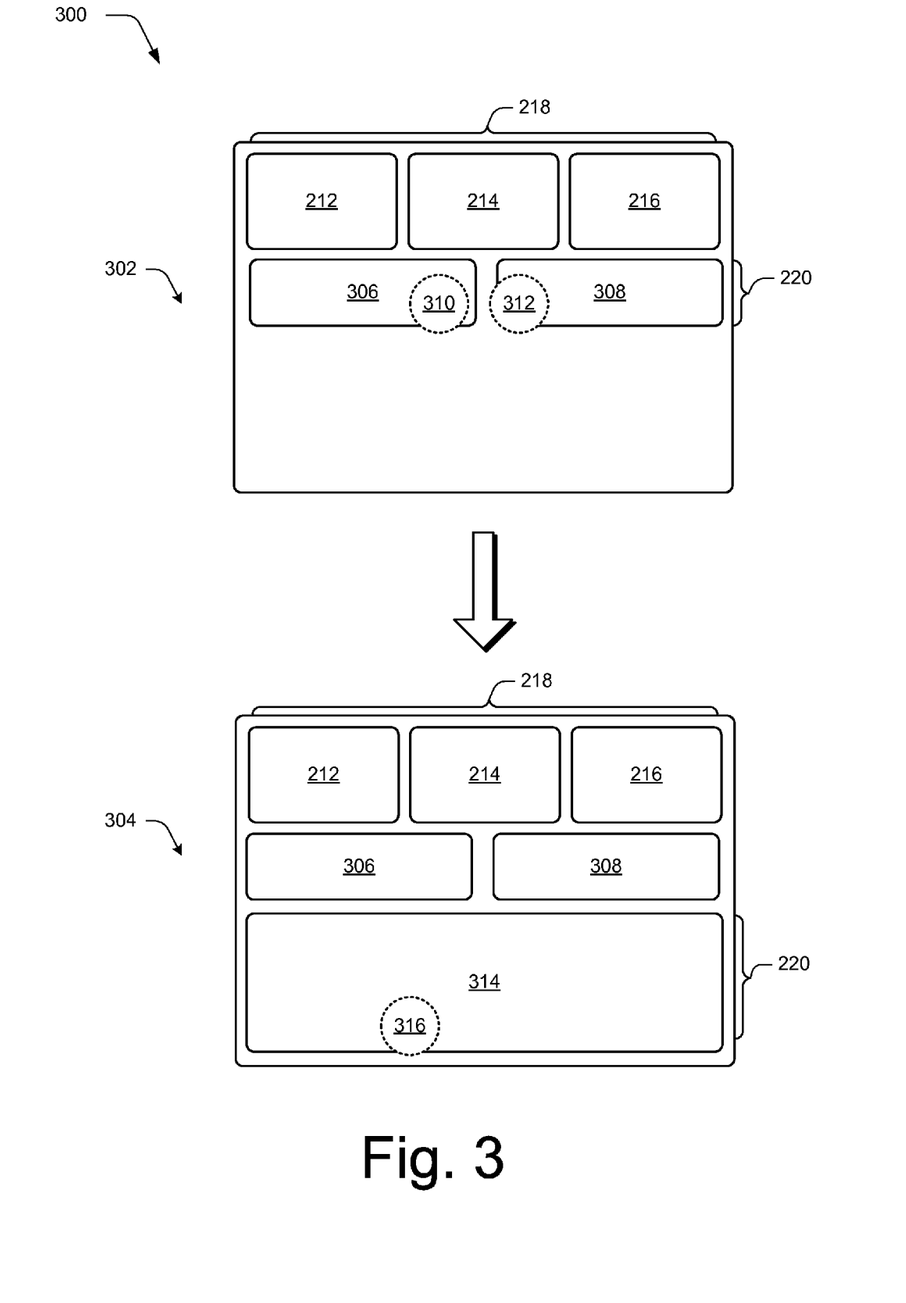
FIG. 3 depicts a system in an example implementation in which the layout of FIG. 2 is expanded to include additional cells.

FIG. 3 depicts a system 300 in an example implementation in which the layout of FIG. 2 is expanded to include additional cells. This system 300 is also illustrated using first and second stages 302, 304. At the first stage 302, first and second cells 306, 308 are created by the layout module 112 responsive to detection of first and second touch inputs 310, 312. As before, the cells 306, 308 have matching sizes with a width corresponding to an available display area in a user interface along a horizontal axis 218 and a height based on a location of the touch inputs 310, 312 along a vertical axis 220.

At the second stage 304, a single cell 316 is created by the layout module 112 responsive to detection of a single touch input 314. As before, the cell 316 has a width corresponding to an available display area in a user interface along a horizontal axis 218 and a height based on a location of the touch inputs 314 along a vertical axis 220. Other examples are also contemplated, such as to create five or more cells along an axis based on fingers of one or more of the user's hands 106, 108.

Although a horizontal axis was described in this example, other directions are also contemplated, such as a vertical axis. For example, an arrangement of the touch inputs may specify an axis along which the cells are to be created. As shown in the first stage 302, for instance, the touch inputs 310 312 indicate a horizontal axis generally and therefore the cells may be created along this axis. A vertical axis of cells as shown in FIG. 1 may also be created using similar techniques. Further, the axis may be "mixed and matched" such that alternating directions may be used to fill in different portions of the user interface. For example, the available display area in the creation of a row of cells may be based at least in part on a previously created column of cells and vice versa. Modifications may also be made to the layout for cells that were already created using the previous techniques, an example of which is described as follows and shown in the corresponding figure.

Figure 4:
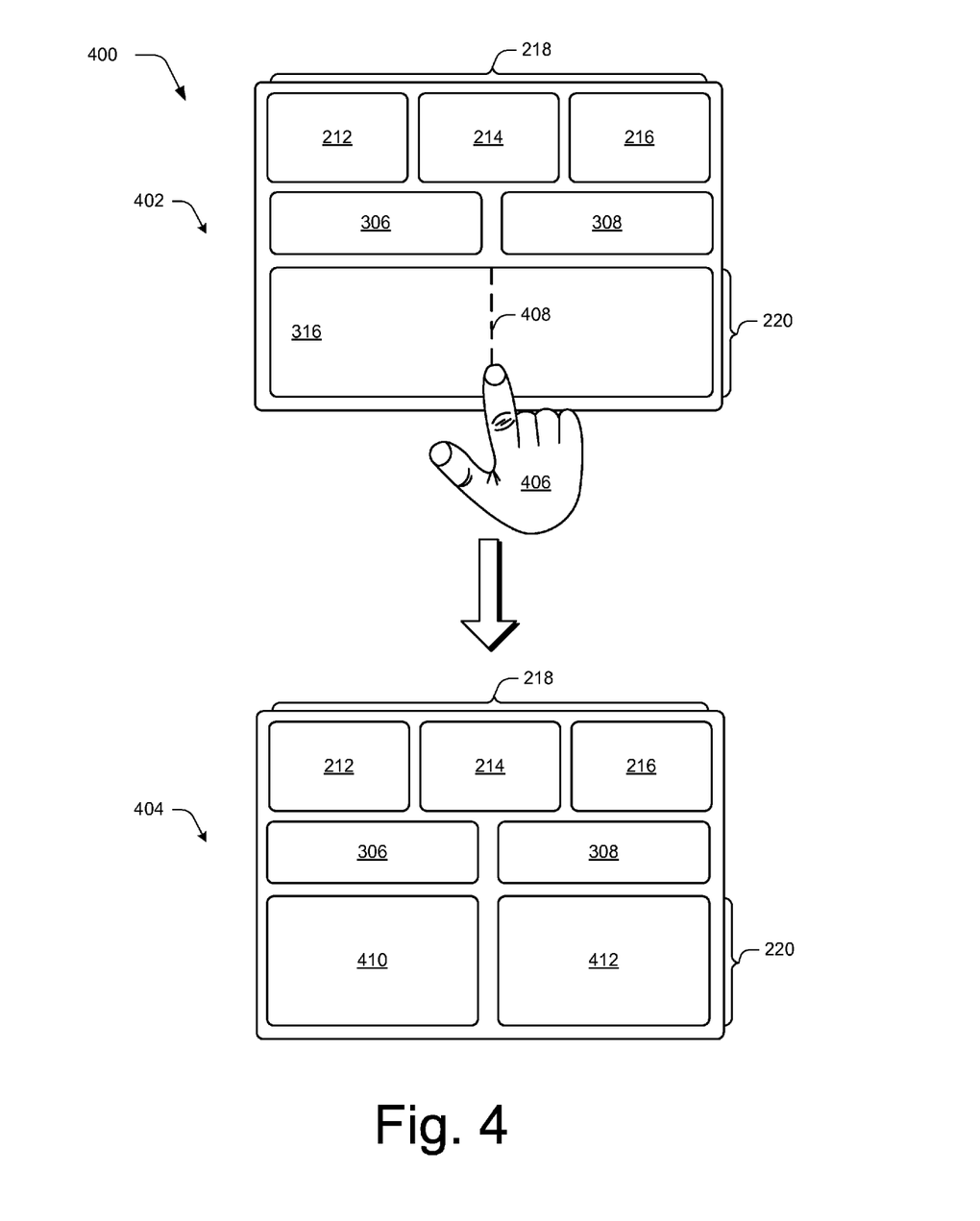
FIG. 4 depicts a system in an example implementation in which one or more touch inputs are utilized to divide a cell in a layout into two or more additional cells.

FIG. 4 depicts a system 400 in an example implementation in which one or more touch inputs are utilized to divide a cell in a layout into two or more additional cells. This system 400 is also shown using first and second stages 402, 404. At the first stage 402, a layout as created in FIG. 3 is shown. A touch input is recognized that involves movement through one or more cells of the layout. This is illustrated in this example through movement of a finger of a user's hand 406 through cell 316, which is illustrated as a dashed line 408.

The layout module 112 may then determine a direction of the movement as well as a number of touch inputs to divide the cell 316. As shown in the second stage 404, a single touch input was detected as moving generally along a vertical axis 220 of the cell 316. Accordingly, the cell 316 is divided into first and second cells 410, 412. The cells 410, 412 as before have a size based on the available display area along the horizontal axis 218 as previously described and has a height 412 taken from the previous cell 316. Thus, a number and dividing point of cells may be based on a number and direction of the touch inputs, another example of which is described as follows and shown in the corresponding figure.

Figure 5:
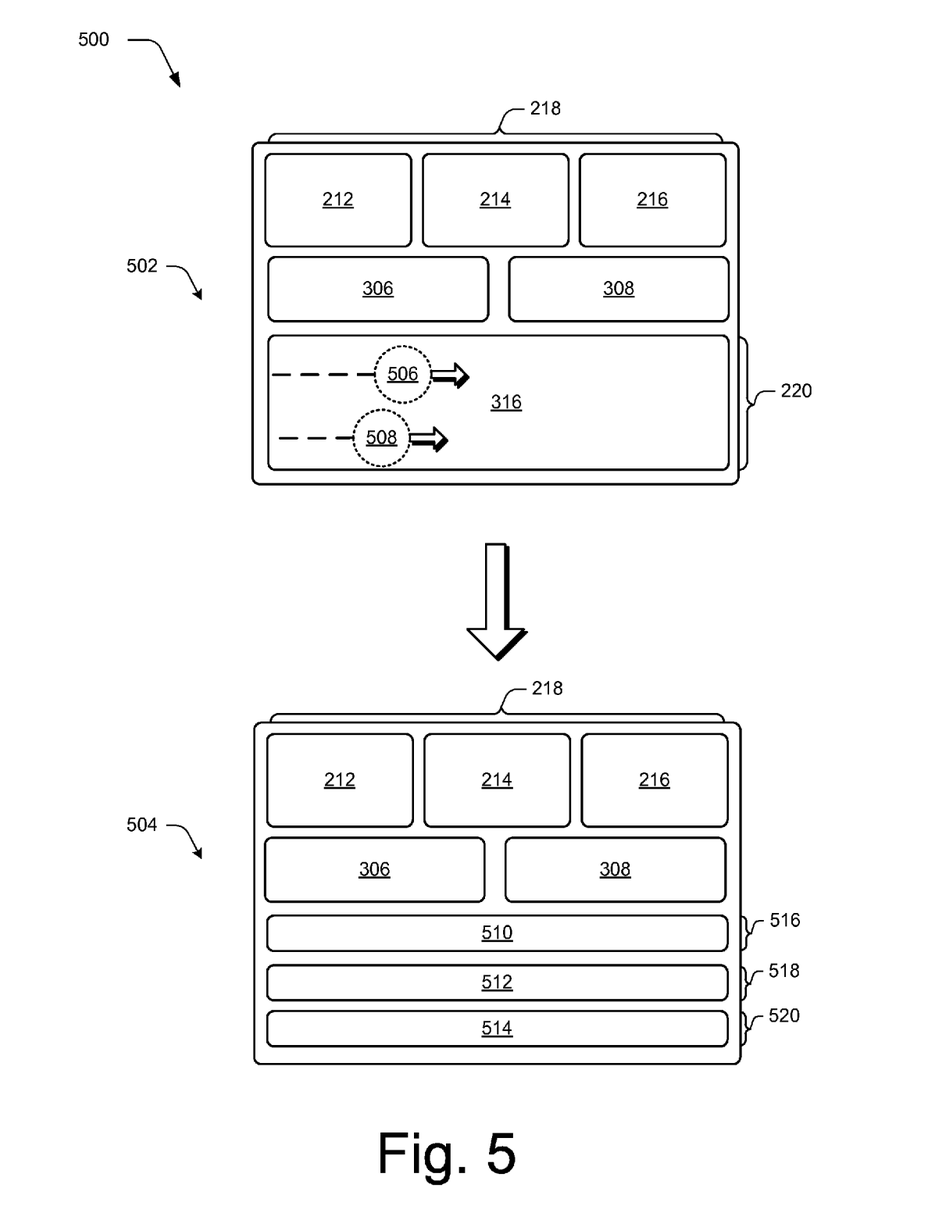
FIG. 5 depicts a system in another example implementation in which a plurality of touch inputs are utilized to divide a cell into a plurality of additional cells.

FIG. 5 depicts a system 500 in another example implementation in which a plurality of touch inputs are utilized to divide a cell into a plurality of additional cells. This system 500 is also shown using first and second stages 502, 504. At the first stage 502, a layout as created in FIG. 3 is also shown. A touch input is recognized that involves movement through cell 316 of the layout. This is illustrated in this example through movement touch inputs 506, 508 and phantom lines as showing movement through cell 316.

In this example, the layout module 112 recognizes movement as following a generally horizontal axis 216 of the user interface and involving two touch inputs. Accordingly, the layout module 112 divides the cells along a direction of the movement of the touch inputs 506, 508 and based on a number of the touch inputs 506, 508. This may be determined in a variety of ways. For example, the direction of movement of the touch points may be used to decide whether to divide the cell into horizontal or vertical cells. This direction may be determined based on quadrants that are defined by 45 degree angles, with an average position of the touch inputs used as a starting position and thus center point of those angles.

Thus, in the illustrated example shown in the second stage 504, the touch inputs 506, 508 are used to divide the cell 316 into three cells 510, 512, 514 having corresponding heights 516, 518, 520 based on the height of the cell along the vertical axis 220 as shown in the first stage. In this example, the heights and widths of the cells 510, 512, 514 match, one to another, although other examples are also contemplated, such as based generally on a location of the touch inputs 506, 508, individually, in relation to the cell 316 such that the cells are not divided equally. Other examples of modifications that may be made to a layout are described as follows and shown in a corresponding figure.

Figure 6:
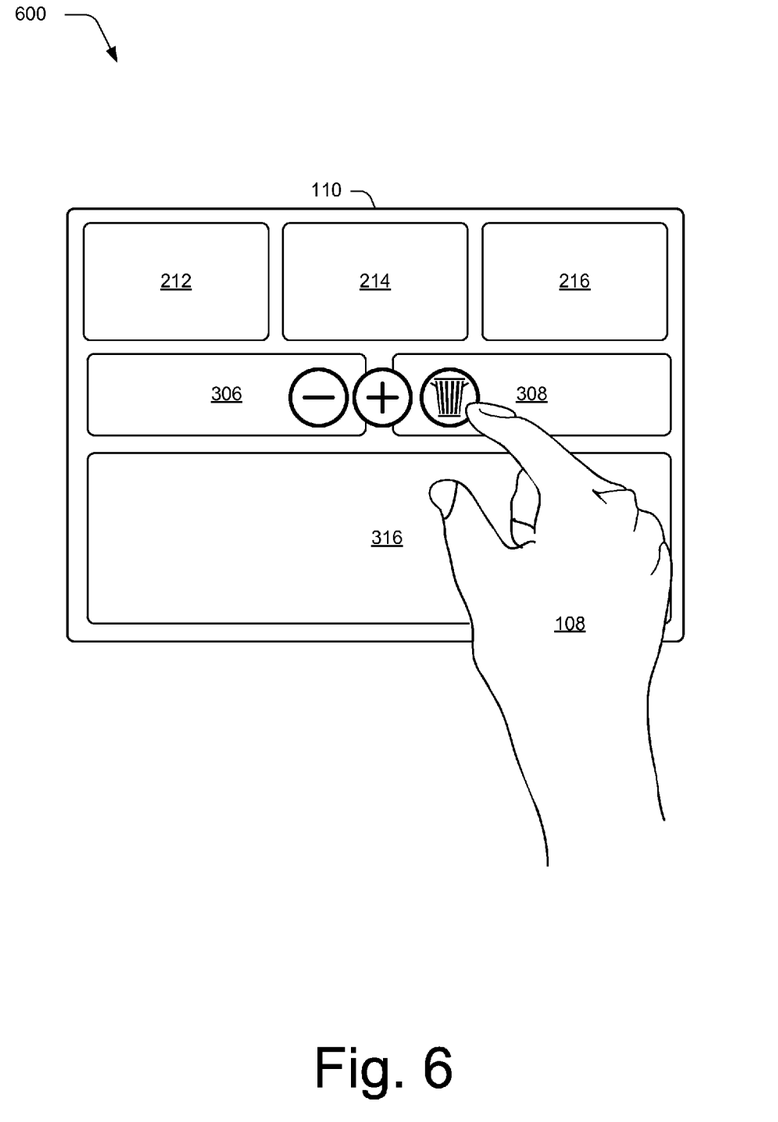
FIG. 6 depicts an example implementation in which an option is output to modify a layout.

FIG. 6 depicts an example implementation 600 in which an option is output to modify a layout. An input may be recognized as being associated with one or more cells in a user interface. In this example, for instance, a tap may be recognized as associated with an axis of cells (e.g., cells 306, 308) in the user interface. In response, the layout module 112 may output an option that is user selectable to modify the layout for that axis.

A variety of different modifications may be made, illustrated examples of which include an option to remove a cell from the axis, add a cell to the axis, and delete the cells in that axis entirely. Thus, a user may efficiently navigate through a created layout to modify it as desired. A variety of other examples are also contemplated without departing from the spirit and scope thereof, further discussion of which may be found in relation to the following procedures.

Example Procedures

The following discussion describes layout techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
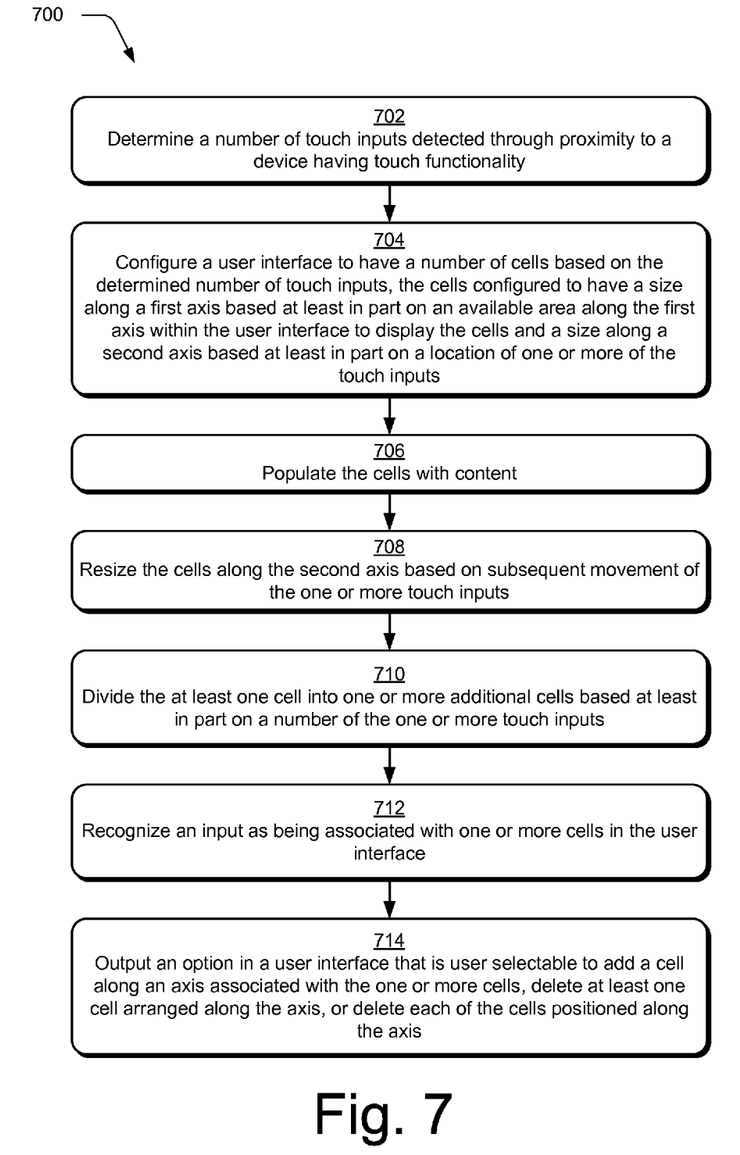
FIG. 7 is a flow diagram depicting a procedure in an example implementation in which cells in a layout are created and modified.

FIG. 7 depicts a procedure 700 in an example implementation in which a layout is created by leveraging one or more touch inputs. A determination is made as to a number of touch inputs detected through proximity to a device having touch functionality (block 702). A device, for instance, may include touch functionality configured to detect proximity of an object as a touch input, such as proximity of one or more user's finger of one or two hands, a stylus, and so on. The layout module 112 may then determine a number for the touch inputs detected, which may be leveraged as described below.

A user interface is configured to have a number of cells based on the determined number of touch inputs, the cells configured to have a size along a first axis based at least in part on an available area along the first axis within the user interface to display the cells and a size along a second axis based at least in part on a location of one of more of the touch inputs (block 704). The first axis, for instance, may be a vertical, horizontal, or other axis and the second axis may be arranged as generally perpendicular to the first axis. A size along the first axis of the cells may be based on an available area within a user interface to display the cells in a layout. This may be based on an available area along the axis in a window, based on other cells in the layout as constraining an available display area, and so on.

The second axis, as previously described, may be used to set a height for the cells based on a location of the touch inputs. This may include an average location of the touch inputs along the second axis, use of an offset, and so on.

The cells are populated with content (block 706). For example, the populating may be performed automatically and without user intervention through specification of a location from which the content is to be retrieved. A user, for instance, may specify a particular folder (e.g., "my photos"), a network address, and so on. Content available via this location may then be used to populate the cells. This may be based on an order of the content disposed at the location, metadata specified by a user (e.g., dates, authors, recently modified), and so forth. Thus, population of the cells may be performed as part of the creation of the cells to support a rich user experience. Further, the populated cells may be resized as previously described and shown in relation to FIG. 2 such that the content of the cell is resized along with the cell.

The cells are resized along the second axis based on subsequent movement of the one or more touch inputs (block 708). The resizing, for instance, may be based on subsequent movement of the touch inputs that is performed without "lifting" of a user's fingers such that the creation and resizing may be performed as one fluid gesture. Other examples are also contemplated, such as to select and resize the cells.

At least one cell is divided into one or more additional cells in the user interface based at least in part on a number of the one or more touch inputs (block 710). The dividing may be based at least in part of a direction of movement of the one or more touch inputs. As previously described, the user interface may be divided into quadrants, which may be based on forty five degree angles to the first and second axis. Movement through these quadrants may be used to determine a direction and thus an intention of a user in dividing the cells.

An input is recognized as being associated with one or more cells in the user interface (block 712). Responsive to the recognition, an option is output in a user interface that is user selectable to add a cell along an axis associated with the one or more cells, delete at least one cell arranged along the axis, or delete each of the cells positioned along the axis (block 714). Thus, in this example the options may be presented to enable a user to further modify the layout as desired.

Example System and Device

Figure 8:
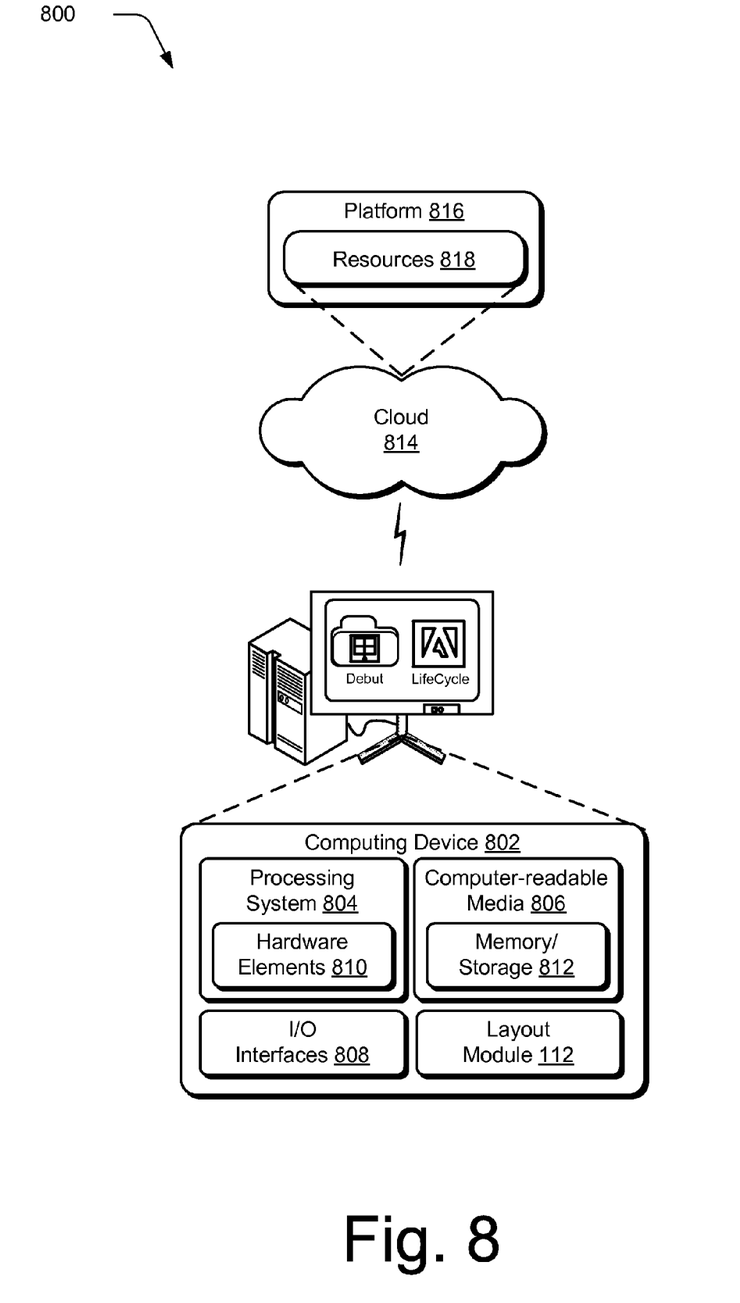
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the layout module 112. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining a number of touch inputs detected through proximity to a device having touch functionality; and
   creating, in a user interface, a number of cells based on the determined number of touch inputs, the number of cells being the same as the determined number of touch inputs, the cells configured to have a size along a first axis based at least in part on an available area along the first axis within the user interface to display the cells and a size along a second axis based at least in part on a location of one of more of the touch inputs.

2. A method as described in claim 1, wherein the first axis is generally perpendicular to the second axis.

3. A method as described in claim 1, wherein the cells have matching sizes along the first or second axis, one to another.

4. A method as described in claim 1, wherein gaps are disposed between the cells in the user interface.

5. A method as described in claim 1, further comprising populating the cells with content.

6. A method as described in claim 5, wherein the populating is performed automatically and without user intervention through specification of a location from which the content is to be retrieved.

7. A method as described in claim 1, further comprising resizing the cells along the second axis based on subsequent movement of the one or more touch inputs.

8. A method as described in claim 1, further comprising dividing the at least one cell into one or more additional cells in the user interface based at least in part on a number of the one or more touch inputs.

9. A method as described in claim 8, wherein the dividing is based at least in part of a direction of movement of the one or more touch inputs.

10. A method as described in claim 1, further comprising:
    recognizing an input as being associated with one or more cells in the user interface; and
    responsive to the recognizing, outputting an option in a user interface that is user selectable to add a cell along an axis associated with the one or more cells, delete at least one cell arranged along the axis, or delete each of the cells positioned along the axis.

11. A method as described in claim 1, wherein the cells have matching sizes along the first or second axis, one to another.

12. A method as described in claim 1, further comprising populating the cells with content, the populating being performed automatically and without user intervention through specification of a location from which the content is to be retrieved.

13. A method comprising:
recognizing one or more inputs as describing movement of one or more touch inputs through at least one cell in a layout in a user interface;
determining a number of the one of more touch inputs involved in the one or more inputs; and
dividing the at least one cell into one or more cells in the user interface based at least in part on:
a number of the one or more touch inputs; and
a direction of movement of the one or more inputs, the direction determined based on quadrants that are defined by forty five degree angles with a start position of the movement defining a center point of the angles.

14. A method as described in claim 13, wherein the recognizing includes identifying the at least one cell in the layout based on respective locations of the one or more touch inputs in the user interface.

15. A method as described in claim 13, wherein the direction of the movement defines an axis in the user interface along which the dividing is to be performed.

16. A method as described in claim 13, further comprising:
recognizing an input as being associated with one or more cells in the user interface; and
responsive to the recognizing, outputting an option in a user interface that is user selectable to add a cell along an axis associated with the one or more cells, delete at least one cell arranged along the axis, or delete each of the cells positioned along the axis.

17. A system comprising:
at least one module implemented at least partially in hardware, the at least one module configured to create, in a user interface, a number of cells based on a detected number of touch inputs, the number of cells being the same as the detected number of touch inputs, the cells configured to have a size along a first axis based at least in part on an available area within the user interface to display the cells and a size along a second axis based at least in part on a location of one of more of the touch inputs; and
one or more modules implemented at least partially in hardware, the one or more modules configured to recognize one or more inputs as describing movement of at least one touch input through at least one cell in a layout in a user interface and divide the at least one cell based at least in part on a number of the at least one touch input.

18. A system as described in claim 17, wherein the first axis is generally perpendicular to the second axis.

19. A system as described in claim 17, wherein the dividing is based at least in part of a direction of movement of the one or more touch inputs, the direction of the movement defining an axis in the user interface along which the dividing is to be performed.

20. A system as described in claim 17, further comprising an additional module configured to recognize an input as being associated with one or more cells in the user interface and responsive to the recognizing, output an option in a user interface that is user selectable to add a cell along an axis associated with the one or more cells, delete at least one cell arranged along the axis, or delete each of the cells positioned along the axis.

* * * * *